United States Patent [15] 3,648,944

Fujiwara et al. [45] Mar. 14, 1972

[54] REEL

[72] Inventors: Hirotomo Fujiwara; Takuya Arai, both of Tokyo, Japan

[73] Assignee: Fuji Photo Film Co., Ltd., Kamigun, Kanagawa, Japan

[22] Filed: Jan. 9, 1970

[21] Appl. No.: 1,671

[30] Foreign Application Priority Data

Jan. 11, 1969 Japan....................................44/2920

[52] U.S. Cl...............................................................242/74
[51] Int. Cl..........................................................B65h 75/28
[58] Field of Search .......................242/71.8, 74, 74.1, 125.1

[56] References Cited

UNITED STATES PATENTS 2,189,547 2/1940 Fischer ...............................242/74 X
2,954,941 10/1960 Hultgren.................................242/74
2,974,892 3/1961 Geloso.................................242/74 X
1,429,692 9/1922 Passavanti ..............................242/74

FOREIGN PATENTS OR APPLICATIONS 1,164,842 5/1958 France...................................242/74
206,963 6/1956 Australia................................242/74

*Primary Examiner*—George F. Mautz
*Assistant Examiner*—Gregory A. Walters
*Attorney*—Sughrue, Rothwell, Mion, Zinn & Macpeak

[57] ABSTRACT

A reel including a pair of flanges and a hub member has an axial slit on the hub periphery. A projection with a concave top surface is disposed inside the peripheral wall of the hub member. The engaging end of a magnetic tape or the like is held on the concave top surface of the projection by the finger of the operator with the tape end engaged by the slit to cause take-up of the tape on the reel during rotation of the same.

3 Claims, 3 Drawing Figures

INVENTORS
HIROTOMA FUJIWARA
TAKUYA ARAI

BY Sughrue, Rothwell, Mion, Zinn & Macpeak
ATTORNEYS

REEL

BACKGROUND OF THE INVENTION

1. Field of the Invention

This invention relates to a reel, and in particular to a reel for easily winding up magnetic tapes and the like.

2. Description of the Prior Art

Generally, in this kind of reel, it is desired and required that the end of the tape be easily engaged with the reel when taking up the same and that the end of the tape can be easily removed from the reel when rewinding.

In order to accomplish this end, various kinds of reels have been designed and used. None have been completely satisfactory.

SUMMARY OF THE INVENTION

This invention provides an improved reel for facilitating the taking-up or winding operation of the tape on a reel.

A projection whose top surface is concave is disposed in the hub member of the reel. Near the projection the wall of the hub member is provided with a slit to guide the end of the tape therethrough. When taking up the tape on the reel, the operator holds the end of the tape on the concave top surface of the projection and turns the reel more than one revolution to overlap the same. Thus, the tape is easily wound on the reel.

DESCRIPTION OF THE PREFERRED EMBODIMENT

Figure 1:
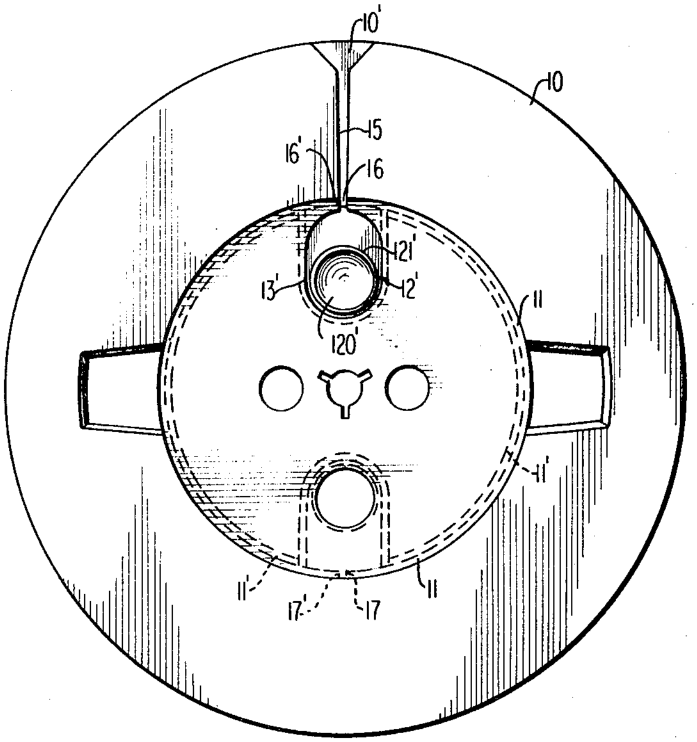
FIG. 1 is a plan view of the reel in accordance with the invention.
Figure 2:
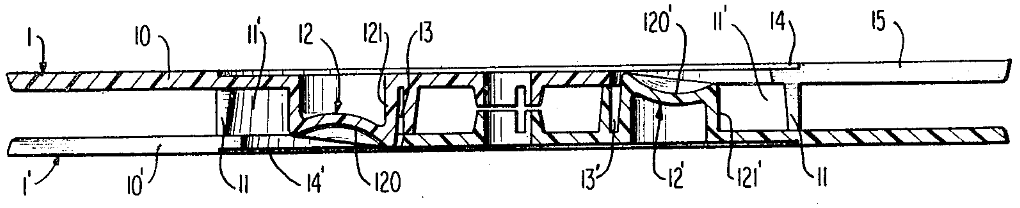
FIG. 2 is a cross-sectional side view of the reel shown in FIG. 1.
Figure 3:
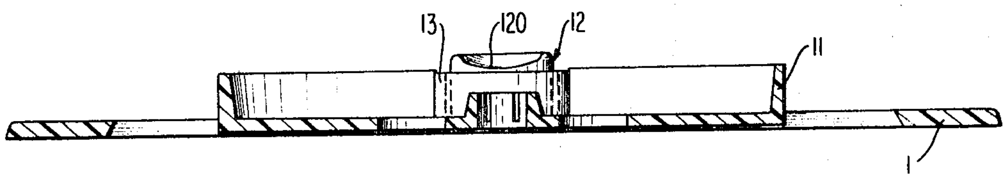
FIG. 3 is a cross-sectional front view of one reel half to be assembled into the reel shown in FIGS. 1 and 2.

One of the embodiments of the reel in accordance with this invention is shown in FIGS. 1, 2 and 3.

The reel in accordance with the present invention consists of a pair of similar reel halves 1, 1' fitted with each other. Each reel half 1 or 1' has a flange portion 10 or 10' and hub forming portions 11 or 11'. Within the hub forming portions 11 or 11', tape end holding projections 12 or 12' having a concave top surface 120 or 120' are provided. Around each cylindrical projection 12, 12' which have peripheral surfaces 121, 121' tape guiding spaces 13, 13' are provided around the projections 12, 12' for easily and smoothly guiding the tape therethrough.

Substantially circular openings 14, 14' are provided at opposite positions on the reel half 1, 1' to the tape end holding projection 12, 12' with respect to the center of the reel. The circular openings 14, 14' are large enough to let the tape end holding projection 12', 12 of the other reel half 1', 1 extend therethrough. The openings 14, 14', are connected with radial slits 15, 15' provided on the flange portions 10, 10'. Both reel halves 1 and 1' are fixed to each other in the reversed relationship as shown in FIG. 2, so that the tape end holding projections 12, 12' are projected through the circular openings 14', 14 of respective reel halves 1', 1. The diameter of the hub forming portion 11 of one reel half 1 is slightly larger than the hub forming portion 11' of the other reel half 1'. This makes one reel half 1 firmly fixed to the other reel half 1' with the hub forming portions 11, 11' in contact with each other as best shown in FIG. 2.

The wall of the hub forming portion 11 is provided with a slit 16 at the position facing tape end holding projection 12' and a slit 17 at the opposite position to the slit 16 with respect to the center of the reel half 1. The slits 16 and 17 are of sufficient width to allow the tape to be guided therethrough. The slits 16 and 17 are provided with round corners 16', 17' at the positions where the tape is bent over.

When using the reel constructed as described above, the end of the tape is inserted into the hub forming portion 11, 11' through the slit 16 or 17 and the end of the tape is placed on concave top surface 120' or 120 of a tape end holding projection 12' or 12. Then, by holding the end of the tape with finger on the concave surface 120' or 120, the reel is turned in the takeup direction. Thus, the tape is wound on the hub. After the tape is once wound on the hub of the reel, the tape can be easily taken up, even if the finger is removed from the holding position on the projection. Since the top surface of the tape end holding projection 12, 12' is concave, the holding finger will not get out of place when the reel is turned. Thus, the tape is easily wound on the hub just by holding the end of the tape with a fingertip.

When removing the tape from the reel during rewinding, the tape is easily and naturally removed from the tape reel by turning the reel in the opposite direction and by pulling the tape lightly from the reel.

Moreover, by guiding the tape end around the outside periphery of the projection 12 or 12', and using the said space around the projection, such that the tape is wound around a projection 12, 12', the tape can be wound on the hub by turning the reel as well.

As described hereinabove, in accordance with the present invention, the tape can be easily wound on or rewound from the reel just by holding the end of the tape on the projection provided on the reel with a fingertip or just by pulling the tape.

What is claimed is:

1. A tape reel comprising:
   - a pair of flanges,
   - a cylindrical hub portion extending between said flanges and coupling the same,
   - an opening within at least one flange, internally of said hub,
   - a cylindrical projection of a diameter approximating that of a human finger extending axially toward said opening from the opposite side of said hub, and terminating in a concave end surface axially inwards of the flange carrying said opening, and being positioned within said opening,
   - a radial slit extending outwardly of said opening within said flange, and
   - an axial slit operatively associated with said projection and extending across said hub in line with said radial slit to permit said tape to easily wrap itself about said hub after the terminal portion is pressed against the finger receiving concave end of said cylindrical projection.

2. A tape reel as defined in claim 1 wherein said flanges and hub portion are constructed by a pair of substantially identical molded reel halves, with each comprising a flange portion and an interfitting hub forming portion.

3. A tape reel as defined in claim 2 wherein a space is provided around said projection for allowing tape to be wrapped thereabout.

* * * * *